United States Patent [19]

Greis et al.

[11] 3,883,688

[45] May 13, 1975

[54] METHOD AND ARRANGEMENT FOR RECORDING BY A WRITING BEAM

[75] Inventors: Ulrich Greis, Weyarn; Josef Helmberger, Munich, both of Germany

[73] Assignee: Agfa-Gevaert Aktiengesellschaft, Leverkusen, Germany

[22] Filed: Feb. 26, 1974

[21] Appl. No.: 446,019

[30] Foreign Application Priority Data

Mar. 29, 1973 Germany............................ 2315594

[52] U.S. Cl............................. 178/6.7 R; 178/7.3 D

[51] Int. Cl............................ H04n 5/66; H04n 5/84

[58] Field of Search............... 178/6.7 R, 6.7 A, 7.6, 178/7.3 D, 7.5, 7.7; 358/6; 346/108

[56] References Cited

UNITED STATES PATENTS

| | | | |
|---|---|---|---|
| 3,244,808 | 4/1966 | Roberts | 178/DIG. 3 |
| 3,562,420 | 2/1971 | Thompson | 178/6 |
| 3,739,082 | 6/1973 | Lippel | 178/DIG. 3 |
| 3,792,196 | 2/1974 | Wendland | 178/7.7 |
| 3,809,806 | 5/1974 | Walker | 178/7.6 |

*Primary Examiner*—Howard W. Britton
*Attorney, Agent, or Firm*—Michael S. Striker

[57] ABSTRACT

A method and an arrangement for line-by-line recording of information by a controlled writing beam in which random statistical fluctuations are superimposed on the repeating vertical error deflections of the beam.

15 Claims, 4 Drawing Figures

METHOD AND ARRANGEMENT FOR RECORDING BY A WRITING BEAM

BACKGROUND OF THE INVENTION

The present invention relates to the method and apparatus for line-by-line recording of information by a controlled writing beam, and in particular to correcting periodic errors associated with such recording methods.

Such errors may arise in an apparatus using a mirror wheel, in which an angular error may be associated with one or more plane faces of the mirror wheel. As the mirror wheel rotates on its axis, an error associated with one particular facet is repeated periodically on the recording media.

SUMMARY OF THE INVENTION

An object of the invention is to provide a method and an arrangement for line-by-line recording by a controlled writing beam without significant periodic errors.

Another object of the invention is to provide novel and improved means for making line-by-line recordings utilizing a mirror wheel.

Another object of the invention is to superimpose random statistical fluctuations on the vertical deflection of a writing beam.

The invention is embodied both in the method and arrangement for producing random statistical fluctuations (such as "noise"), centering these fluctuations about a key frequency, and limiting their amplitude. These fluctuations then are superimposed and modulate the vertical deflection control means of the writing beam.

The magnitude or amplitude of the fluctuations are limited so that neighboring scanning lines do not interfere with each other; thus, the maximum vertical deflection associated with the statistical fluctuations is equal to one-half the distance between the scanning lines.

The sweep frequency lies preferably between the video frequency of the writing beam, and one-third of the video frequency.

The writing beam may be a laser beam, controlled by an electro-optical deflection system; the source of random statistical fluctuations may be a signal generator with a certain noise level or output, connected to the vertical deflection element of the electro-optical system.

Other deflection systems may be electromechanical or piezoelectric in nature.

Another embodiment of the invention may employ an electron beam, and electronic grids or plates as a deflection system. Here again, a statistical fluctuation from a signal generator would be applied to the vertical deflection plates.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

DESCRIPTION OF THE PREFERRED EMBODIMENTS

Figure 1:
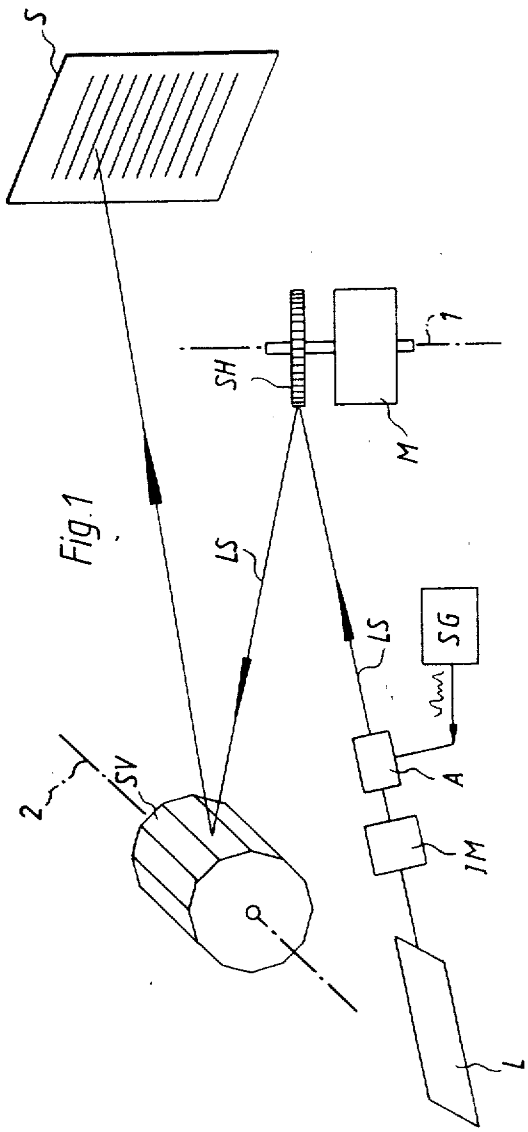
FIG. 1 illustrates an embodiment of the invention with a guided laser beam.

FIG. 1 illustrates an embodiment of the invention with a guided laser beam LS. The laser beam LS is reflected in two directions by two mirror wheels, SH and SV, with non-colineor axes 1 and 2 respectively, and writes images onto a surface S in a line-by-line fashion. The mirror wheels SH and SV are rotated by a motor M. The scanning apparatus as illustrated is well known, and it is unnecessary to feature all of the details in the figure.

The laser beam LS originates in a laser L, and is directed into an intensity-modulator IM, which modulates, in a known manner, the beam with picture-content information. The beam is then directed to an electro-optical refracting device A, which is controlled by a signal generator SG to produce statistical fluctuations in the beam. The frequency of the signal generator lies preferably in the range of the video or picture frequency, i.e., up to a third of the frequency of the intensity modulator IM.

The electro-optical refracting device A deflects the laser beam LS in a direction transverse to the direction of the writing lines on S as a result of the statistical impulses. The maximum amplitude of the transverse deviation on S is at most equal to half the distance between the writing lines.

The statistical fluctuation signal generator SG may be a noise generator (such as the Rohde & Schwartz noise generator SUF or SKTU), together with a bandpass filter. The mean frequency of the bandpass filter determines the frequency of the statistical pulses (for example, from 1 to 0.3). The bandwidth of the bandpass filter determines deviations from this frequency, and the speed of the change of the amplitude thereof.

Figure 2:
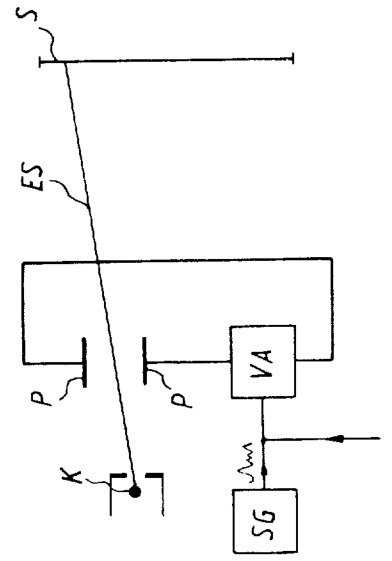
FIG. 2 illustrates another embodiment of the invention with a guided electron beam.

FIG. 2, schematically illustrates a known control apparatus utilizing an electron beam ES, such as a cathode ray electron beam, directed at a screen surface S. The beam ES is focussed and accelerated by electrodes P and the vertical direction control unit VA both in terms of horizontal scan and vertical movement, on the image field S. The beam originates with the cathode K.

The electrodes P are connected to a signal generator SG which serves the same purpose as the device A as in FIG. 1, i.e., to produce statistical fluctuations in the vertical movement of the electron beam ES.

Figure 3:
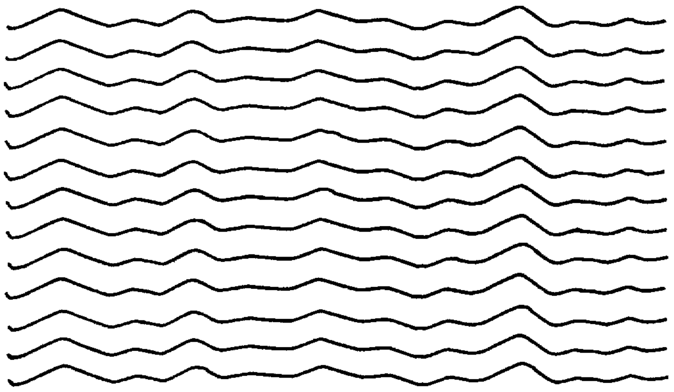
FIG. 3 is a portion of a recording with a periodic error.
Figure 4:
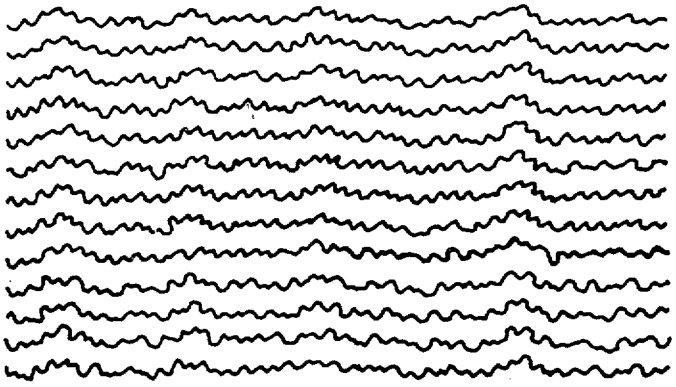
FIG. 4 is a portion of a recording as shown in FIG. 3 with a superimposed statistical error.

FIGS. 3 and 4 illustrates the effect of the statistical fluctuations. FIG. 3 is a portion of a recording on the image screen S with a periodic error found at the same point in every scanning line, which produce disturbing patterns on the recording surface.

FIG. 4 is the same original pattern, but with the signal generator applied to control the movements of the writing beam. The amplitude of the maximum disturbance is equal to half the distance between the horizontal scanning lines. The original periodically repeating error pattern is suppressed, and the overall reproduction quality is improved.

The invention is not meant to be limited to these particular embodiments. Other applications may include large-picture projections of television screen pictures, the recording of television screen pictures on movie film through the means of an electron beam, or the production of duplications or copies of an original through scanning techniques.

While the invention has been illustrated and described as embodied in a method and arrangement for line-by-line recording, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of line-by-line recording of information by a controlled writing beam, comprising directing a writing beam with a predetermined picture frequency and having a transverse movement due to a periodically repeating error, and a longitudinal movement, at a recording medium to record a plurality of recording lines spaced a predetermined distance from each other; controlling the longitudinal movement of said writing beam; and controlling the transverse movement of said writing beam by means of statistical fluctuations, said fluctuations having a maximum amplitude equal to half said predetermined distance between said recording lines so as to suppress said periodically repeating error.

2. A method as defined in claim 1, wherein said transverse movement controlling step further comprises limiting the transverse deviation frequency of said statistical fluctuations to lie between one-third and one times the picture frequency of said writing beam.

3. A method as defined in claim 1, wherein said controlling steps further comprise modulation of said writing beam by an electro-optical refracting device.

4. A method as defined in claim 1, wherein said transverse movement controlling step further comprises utilizing a signal generator to produce said statistical fluctuations resulting in vertical deflections of the writing beam.

5. A method as defined in claim 1, wherein said writing beam is a laser beam.

6. A method as defined in claim 1, wherein said writing beam is an electron beam.

7. An arrangement for line-by-line recording of information by a controlled writing beam comprising means for generating a writing beam; a recording medium spaced from said generating means; means for controlling movement of said writing beam to produce on said recording medium a plurality of substantially parallel recording lines spaced in transverse direction from each other, said controlling means producing in said recording lines transverse deflections forming a repeating error pattern; and means for superimposing deflections to said beam in accordance with statistical fluctuations to suppress said error pattern.

8. An arrangement as defined in claim 7, wherein said control means comprise an electromechanical deflection device.

9. An arrangement as defined in claim 7, wherein said superimposing means for said statistical fluctuations is a signal generator.

10. An arrangement as defined in claim 7, wherein said control means comprise an electro-optical deflection device.

11. An arrangement as defined in claim 7, wherein the control means comprise a piezoelectric deflection device.

12. An arrangement as defined in claim 7, wherein said writing beam is a laser beam.

13. An arrangement as defined in claim 7, wherein said writing beam is an electron beam.

14. An arrangement as defined in claim 13, wherein said control means comprise deflection electrode plates.

15. An arrangement as defined in claim 7, wherein said superimposing means produce deflections having a frequency greater and an amplitude smaller than the deflections of said error pattern.

* * * * *